United States Patent
Francke et al.

(10) Patent No.: US 6,818,901 B2
(45) Date of Patent: Nov. 16, 2004

(54) GASEOUS-BASED RADIATION DETECTOR

(75) Inventors: Tom Francke, Sollentuna (SE); Christer Ullberg, Sollentuna (SE); Juha Rantanen, Solna (SE)

(73) Assignee: Xcounter AB (SE)

( * ) Notice: Subject to any disclaimer, the term of this patent is extended or adjusted under 35 U.S.C. 154(b) by 237 days.

(21) Appl. No.: 09/985,443

(22) Filed: Nov. 2, 2001

(65) Prior Publication Data

US 2003/0052276 A1 Mar. 20, 2003

(30) Foreign Application Priority Data

Sep. 19, 2001 (SE) ................................................ 0103101

(51) Int. Cl.[7] .............................................. G01T 1/185
(52) U.S. Cl. ...................... 250/385.1; 250/374; 250/375
(58) Field of Search ................................. 250/374, 375, 250/379, 382, 385.1, 385.2, 386; 378/51, 62, 70, 87

(56) References Cited

U.S. PATENT DOCUMENTS

| | | | |
|---|---|---|---|
| 4,316,089 A | | 2/1982 | Aoyama |
| 4,376,893 A | * | 3/1983 | Whetten ..................... 250/374 |
| 4,491,734 A | | 1/1985 | Yamaguchi et al. |
| 4,496,842 A | | 1/1985 | Hermens et al. |
| 4,707,608 A | * | 11/1987 | DiBianca ..................... 250/389 |
| 5,594,252 A | | 1/1997 | Day et al. |
| 6,118,125 A | | 9/2000 | Carlson et al. |

FOREIGN PATENT DOCUMENTS

| | | |
|---|---|---|
| JP | 10-186043 A | 7/1998 |
| WO | WO 00/62095 A1 | 10/2000 |

OTHER PUBLICATIONS

Takahashi, et al. "Development of a Multi-Grid Type Microstrip Gas Chamber" IEEE Xplore Citation; pp. 5/55–5/58; vol. 1, ISBN: 0-7803-6503-8; Oct. 15–20, 2000.

* cited by examiner

*Primary Examiner*—Constantine Hannaher
*Assistant Examiner*—Timothy J. Moran
(74) *Attorney, Agent, or Firm*—Birch, Stewart, Kolasch & Birch, LLP

(57) ABSTRACT

A radiation detector comprises two electrode arrangements, each including a dielectric substrate and an electrically conducting layer formed on a first surface of respective dielectric substrate, wherein the electrodes are oriented such that the conducting layers are facing each other. A dielectric spacer is provided to hold the electrodes at a distance from each other to thereby define an inter-electrode space, which, during use, is filled with an ionizable gas. The electrodes are held at respective electric potentials to drift electrons released during ionization of the ionizable gas by external radiation towards one of the electrodes for detection. To suppress the occurrence of sparks in the inter-electrode space an electrically conducting layer is formed on a second surface of the dielectric substrate of either one of the electrodes, and, during use, held at a selected electric potential held at a selected electric potential to thereby reduce the risk for occurrence of sparks between the cathode and anode arrangements.

20 Claims, 6 Drawing Sheets

PRIOR ART

GASEOUS-BASED RADIATION DETECTOR

FIELD OF THE INVENTION

The invention relates to gaseous-based detectors for detection of ionizing radiation.

BACKGROUND OF THE INVENTION AND RELATED ART

Gaseous-based ionizing radiation detectors, in general, are very attractive since they are cheap to manufacture and since they can employ gas multiplication to strongly amplify the signal amplitudes. A particular kind of gaseous-based ionizing radiation detector is the one, in which electrons released by interactions between photons and gas atoms can be extracted in a direction essentially perpendicular to the incident radiation.

Such a detector, of which a portion is, in a front view, illustrated in FIG. 1, comprises typically planar cathode 1, 2 and anode 3, 4 arrangements, respectively, and an ionizable gas arranged in the space 5 formed between the cathode and anode arrangements. The cathode 1, 2 and anode 3, 4 arrangements include each a metallic electrode plate or layer 1, 3 supported by a respective dielectric support 2, 4. The metallic electrode layers 1, 3 are facing each other and are separated by means of a dielectric spacer 6.

The detector is arranged such that a radiation beam 7 from a radiation source can enter the detector sideways between, and essentially parallel with, the cathode and the anode for ionizing the ionizable gas. Further, a voltage is typically applied between the metallic electrode layers 1, 3 for drifting electrons created during ionization of the ionizable gas towards the anode. The electric field caused by the applied voltage is indicated by field lines 8a–b in FIG. 1. Typically, the cathode is held at a negative potential, whereas the anode is grounded.

The voltage and the design of the detector electrodes may be adjusted to achieve a highly concentrated electric field such that the electrons are strongly accelerated and, by means of interactions with the gas, multiplied. Possibly, one or several grid or wire electrodes, which thus is/are electron permeable, may be arranged between the cathode 1, 2 and anode 3, 4 arrangements and may be held at electric potential(s) to achieve suitable amplification.

A read-out arrangement (not illustrated) is typically arranged in connection to the anode for detecting the charge induced by the multiplied electrons.

Due to the strong electric fields created in the gaseous-based ionizing radiation detector, however, spark discharges can occur in the gas, and these can block the detector for a period of time, and can also be harmful for the detector and particularly for electronics thereof. Such spark discharges are particularly probable to occur in high amplification detectors along surfaces of the dielectric spacer 6, which face the space 5 between the cathode and anode arrangements, where the electric field lines 8b are essentially parallel with the surface.

In order to reduce the occurrence of spark discharges the detectors are typically formed with a distance $d_1$ between the outer edges of the conductive cathode and anode layers and the dielectric spacer 6 to define an outer gas volume 77 delimited by the inner surface 9 of the spacer 6, the uncovered electrode substrates 2, 4 outside the electrode layers 1, 3, and the space 5 between the electrode layers 1, 3. Hereby, a longer path along dielectric surfaces between the outer edges of the conductive cathode and anode layers is obtained, and thus the electric field strength is reduced at these surfaces, particularly at surface 9 of the dielectric spacer 6. The longer the distance $d_1$ is, the better spark discharge protection is obtained, but to the cost of large and bulky detectors. In some applications this is not acceptable.

Alternatively, or as a complement, the surface 9 of the dielectric spacer 6 may be made rough or irregular to thereby prevent the formation of streamers at the surface 9. However, a structure of such kind having an effective protection against the occurrence of sparks would be difficult and/or expensive to manufacture.

SUMMARY OF THE INVENTION

A main object of the invention is to provide a detector for detection of ionizing radiation wherein problems caused by spark discharges are reduced or even eliminated.

In this respect there is a particular object to provide such a detector, which is compact and thus suitable to be used in cramped spaces or in a stacked multi-detector configuration.

A further object of the invention is to provide such a detector, which is reliable, accurate, inexpensive, and which has a long lifetime.

These objects, among others, are attained by detectors as claimed in the appended claims.

There are many theories about discharge formation in gases, and especially discharges along dielectric surfaces. The most common explanation is that an electrical discharge is preceded by a streamer formation. A streamer is string of plasma, i.e. electrical charges accumulated in the gas or along a surface. The electrical resistance of the streamer is significantly lower than the resistance of the gas, or of the surface of a dielectric. If a strong electric field is present close the streamer an electrical discharge can occur along the streamer more easily than through the gas itself, or along a dielectric surface.

In the case of the prior art illustrated in FIG. 1, ionizing radiation entering the outer gas volume (reference numeral 77 in FIG. 1) outside the peripheries of the electrode layers will ionize the gas liberating electrons and positive ions. These charges will follow the electric field lines and accumulate on the dielectric surface of the anode and cathode substrates facing the outer gas volume. This accumulation of charges is the initial formation of a streamer. As more charges are added, the charges tend to follow the field lines and creep up along the surface of the spacer facing the outer volume. As the streamer migrate, eventually it will form a short circuit between the anode and the cathode resulting in an electrical discharge along the streamer.

The inventors have found that by modifying the electric field configuration in the outer volume, and especially along the dielectric surfaces forming the boundaries of the outer volume, the probability of an electrical discharge can be significantly reduced. Field configurations where most of the electric field lines are perpendicular to the dielectric surfaces rather than parallel are especially beneficial for suppressing discharge formation.

Further characteristics of the invention, and advantages thereof, will be evident from the detailed description of preferred embodiments of the present invention given hereinafter and the accompanying FIGS. 2–6, which are given by way of illustration only, and thus are not limitative of the present invention.

DESCRIPTION OF PREFERRED EMBODIMENTS

Figure 1:
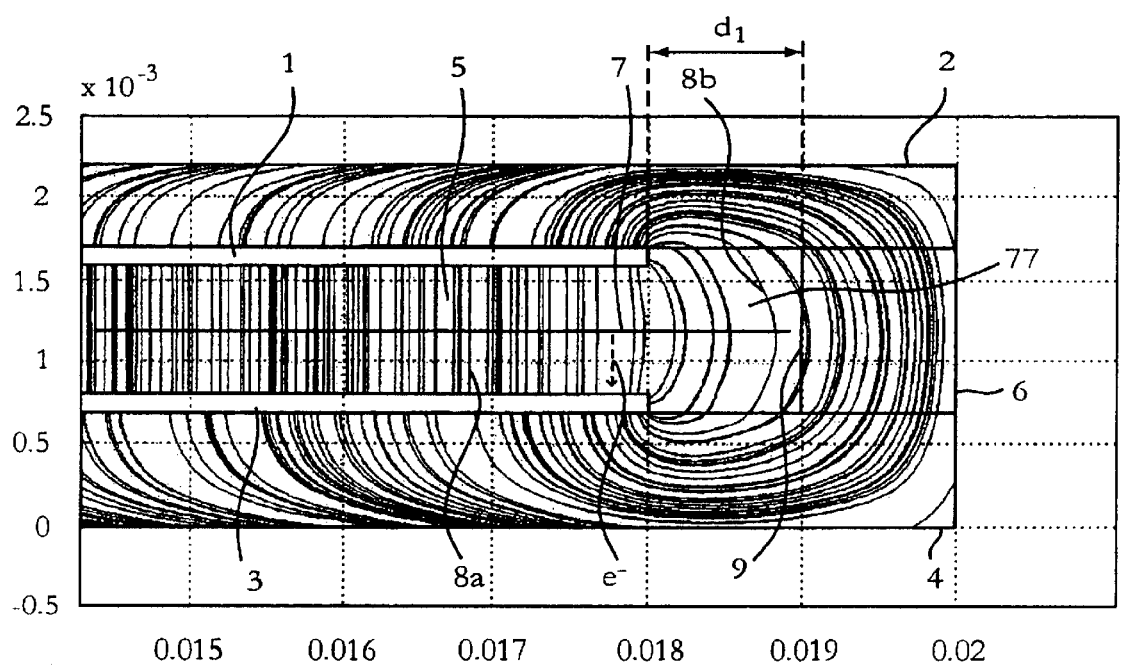
FIG. 1 illustrates schematically, in a front view with the entrance slit window removed, a portion of a detector for planar beam radiography according to prior art.
Figure 2:
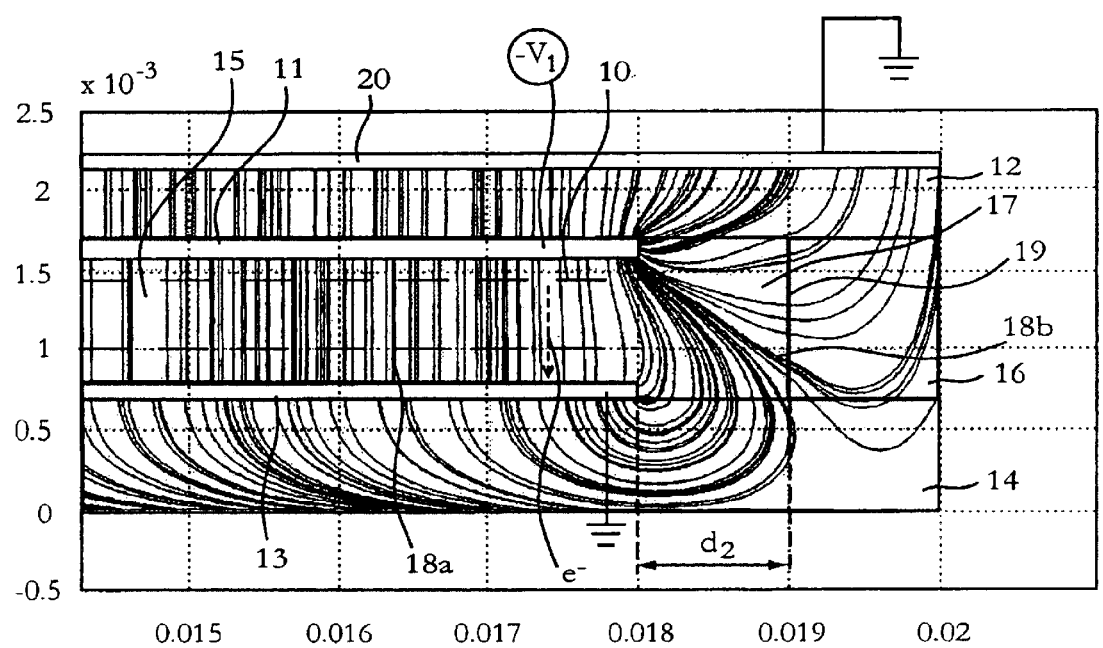
FIG. 2 illustrates schematically, in a front view with the entrance slit window removed but schematically indicated by dashed lines, a portion of a detector for planar beam radiography according to a first embodiment of the present invention. Electric field lines as existing during use of said detector are indicated.

FIG. 2 is a front view of an end portion of a detector for planar beam radiography according to a first embodiment of the present invention.

The detector is oriented such that a planar X-ray beam can enter sideways between a cathode arrangement 11, 12 and an anode arrangement 13, 14. A radiation transparent slit window (schematically indicated by dashed line 10), and optionally a collimator window (not illustrated) are provided at the front of the detector to form an entrance for the X-ray beam to the detector.

Each of the electrode arrangements includes an electrically conducting electrode layer 11, 13 supported by a respective dielectric substrate 12, 14, wherein the arrangements are oriented such that the cathode 11 and anode 13 layers are facing each other.

Preferably, the electrode arrangements 11, 12 and 13, 14 are planar, rectangular and parallel to each other. However, other geometries may be employed.

The electrode arrangements are separated by a spacer or support 16 along at least portions of the peripheries thereof. Preferably, spacer 16 exists only at a few points along the peripheries of the electrode arrangements, sufficiently to keep the cathode and the anode apart. From a discharge point of view it is favorable if the spacer exists only at a few points. The electrode arrangements 11, 12 and 13, 14 and the spacer 16 define an inter-electrode space 15 capable of being filled with a gas or gas mixture. To this end preferably either the electrode arrangements 11, 12 and 13, 14, the spacer 16, the entrance window, and optionally other components (not illustrated) define together a gas-tight confinement, or the electrode arrangements 11, 12 and 13, 14 are arranged within a gas-tight casing (not illustrated). The ionizable gas or gas mixture may e.g. comprise krypton and carbon dioxide or xenon and carbon dioxide. The gas may be under pressure, preferably in a range 1–20 atm. During use of the detector incident radiation is entering inter-electrode space 15 and ionizes the gas or gas mixture therein, and the charge induced by these electrons, or correspondingly produced ions, are subsequently detected.

For this purpose, a high voltage DC supply unit (not illustrated) is provided for the purpose of holding the cathode 11 and the anode 13 at suitable electric potentials to create an electric field 18a within the inter-electrode space 15 for drift of electrons and ions therein. In the FIG. 2 embodiment the cathode 11 is held, during use, at a negative voltage $-V_1$, whereas the anode 13 is grounded. Hence, electrons are drifted towards the anode 13 and ions are drifted towards the cathode 11.

Still further, the detector comprises a read-out arrangement for detection of electrons drifted towards the anode 13 and/or ions drifted towards the cathode 11. The read-out arrangement may be comprised of the anode arrangement 13, 14 itself as illustrated in FIG. 2, or a separate read-out arrangement may be arranged adjacent anode 13 or adjacent cathode 11, or elsewhere.

To provide for imaging capabilities, the anode or read-out layer 13 is preferably comprised of an array of conductive elements or strips arranged side by side and electrically insulated from each other on the dielectric substrate 14. To provide for an increased spatial resolution and for compensation for parallax errors in any detected images the anode/read-out strips extend essentially in directions parallel to the direction of incident photons of the X-ray beam at each location. Thus, given a divergent beam the anode/read-out strips are arranged in a fan-like configuration.

Each of the anode/read-out strips is preferably connected to a read-out and signal-processing device (not illustrated), whereby the signals from each strip can be processed separately. As the anode/read-out strips also constitute the anode suitable couplings for separation are needed.

In the case the read-out arrangement is a separate arrangement, the anode layer 13 can be formed as a unitary electrode without strips.

Further, the FIG. 2 embodiment detector is preferably formed with electrode substrates 12, 14 that are wider and longer than corresponding electrode layers 11, 13 to leave a periphery of the electrode substrates 12, 14 uncovered. At the outermost peripheries of the substrates the spacer 16 is arranged. Typically, there is a distance $d_2$ between the inner surface 19 of the spacer 16 and the outer peripheries of the electrode layers 11, 13, whereby an outer gas volume 17 is defined by the inner surface 19 of the spacer 16, the uncovered electrode substrates 12, 14 outside the electrode layers 11, 13, and the inter-electrode space 15 between the electrode layers 11, 13.

According to the present invention the FIG. 2 detector is provided with an electrically conducting layer 20 on a surface of the dielectric cathode substrate 12, which is opposite to the surface that carries the cathode layer 11. The electrically conducting layer 20 operates as an electric field correction/affection means to modify the electric field within the volume 17 but leaving the electric field within inter-electrode space 15 substantially unaffected or minimally modified. Particularly the electric field lines 18b close to the inner surface 19 of the spacer 16 are modified to thereby eliminate or reduce problems with occurrence of spark discharges.

The present inventors have thus discovered that if the electrically conducting layer 20 is held at an electric potential equal or close to the electric potential, at which the anode layer 13 is held, in the present case at ground, and provided that the substrate 12, 14 thickness and the inter-electrode distance are of the same order of magnitude, the electric field lines that intercept the inner surface 19 of the spacer 16 are altered so as to prevent them from being parallel, or close to parallel, with the inner surface 19 of the spacer, and with the surfaces of the electrode substrates 12, 14 facing the inter-electrode space 15.

The detector, with the electrically conducting layer 20, is thus preferably designed such that each electric field line leaving said inter-electrode space will define an angle with respect to the spacer or substrate surface, which is at least 5°, more preferably at least 10°, and most preferably at least 15°.

For different substrate thicknesses and inter-electrode distances the voltage, at which the layer 20 should be held, is obviously different. However, having knowledge of the purpose of the layer 20 and by guidance of the embodiment described above the skilled electric engineer will have no problems to determine a suitable voltage for layer 20 for a particular detector design.

It shall be appreciated that the risk for occurrence of sparks in volume 17 is further decreased if the entrance slit window extends only to the outer peripheries of the electrode layers 11, 13 or just beyond the peripheries. By such provision the amount of external radiation entering the volume 17, and particularly close to or at the inner surface of spacer 16 is reduced heavily, possibly to zero, and thus the density of electrons is reduced and so is the risk for occurrence of sparks.

It shall further be appreciated that the dielectric surfaces defining volume 17 may be provided with ditches or trenches to further reduce the risk for occurrence of sparks.

Figure 3:
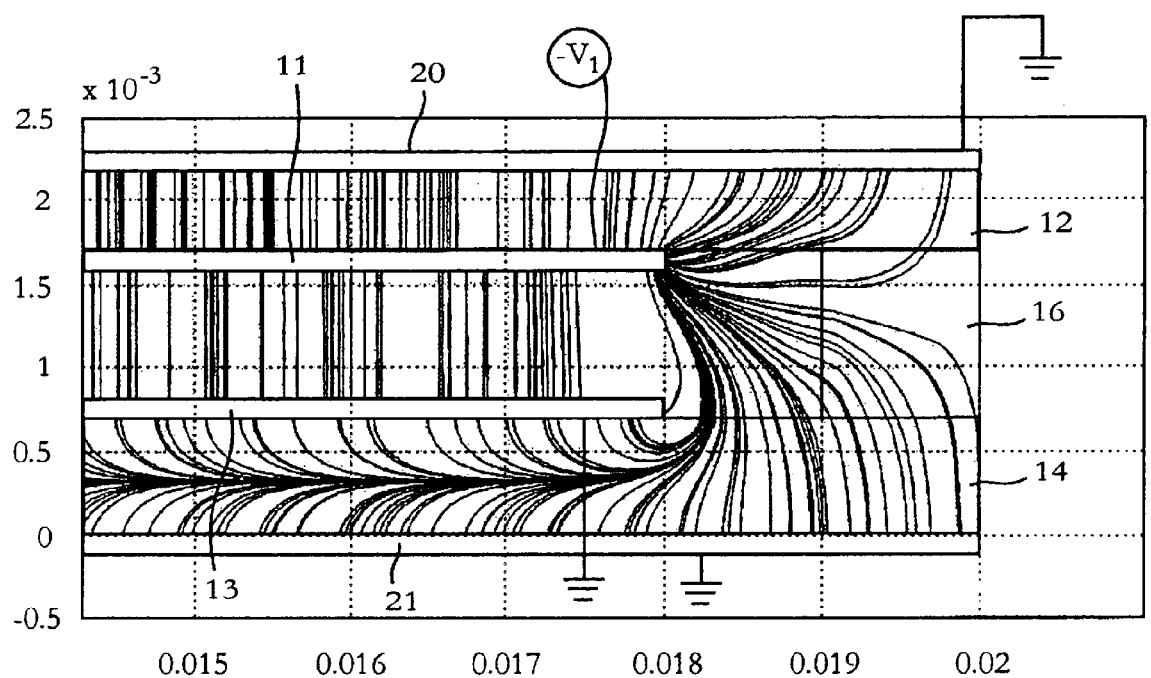
FIGS. 3–5 illustrate each schematically, in a front view with the entrance slit windows removed, a portion of a detector for planar beam radiography according to a respective embodiment of the present invention. Electric field lines as existing during use of said detector are indicated.

Turning now to FIG. 3, which schematically illustrates in a front view a portion of a modified radiation detector a second embodiment of the present invention will shortly be depicted.

This detector differs from the FIG. 2 detector only in that a further electrically conducting layer 21 is arranged on a surface of the dielectric anode substrate 14, which is opposite to the surface that carries the anode layer 12. The electrically conducting layer 21 is as layer 20 grounded, and this affects the electric field particularly within the dielectric anode substrate 14, see the illustrated electric field lines in FIG. 3. The electric field within the inter-electrode space close to the spacer 16 is similar to the one in FIG. 2.

Figure 4:
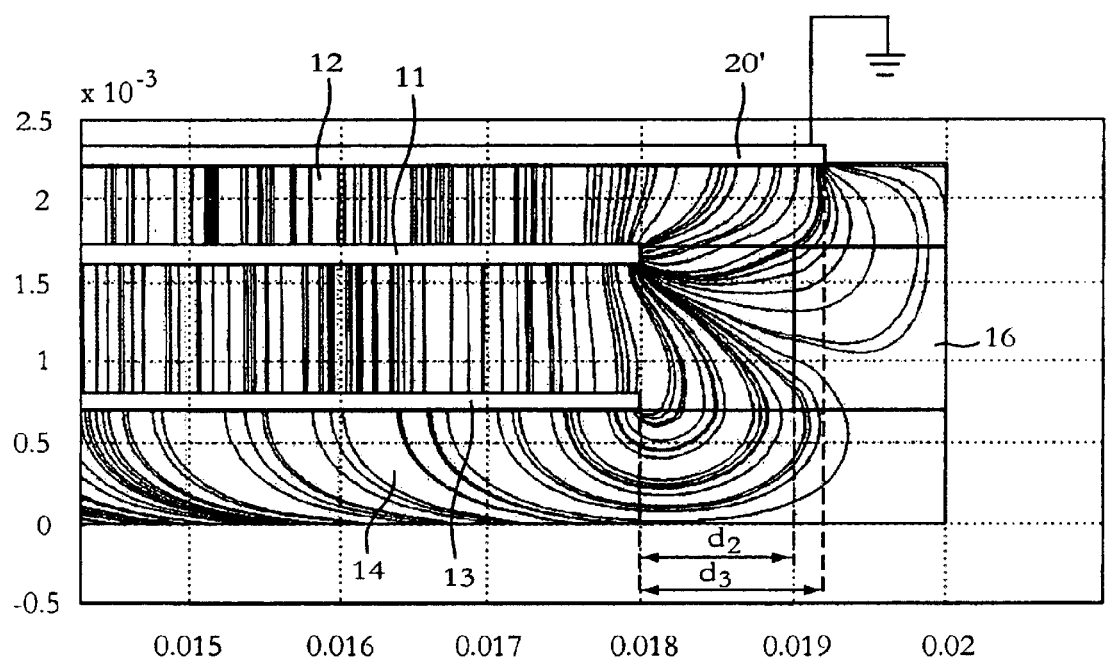

In FIG. 4 is schematically illustrated in a front view a portion of yet a modified radiation detector and this third embodiment of the detector differs from the FIG. 2 embodiment only as regards the extension of the electrically conducting layer 20. The layer, in FIG. 4 denoted 20', extends above the cathode layer 11 and beyond the outer periphery of the cathode layer 11 by a distance $d_3$ as indicated. Distance $d_2$ indicates, as in FIG. 2, the distance between the inner surface of the spacer 16 and the outer peripheries of the electrode layers 11, 13. Thus, the electrically conducting layer 20' extends beyond also the inner surface of the spacer 16.

Figure 5:
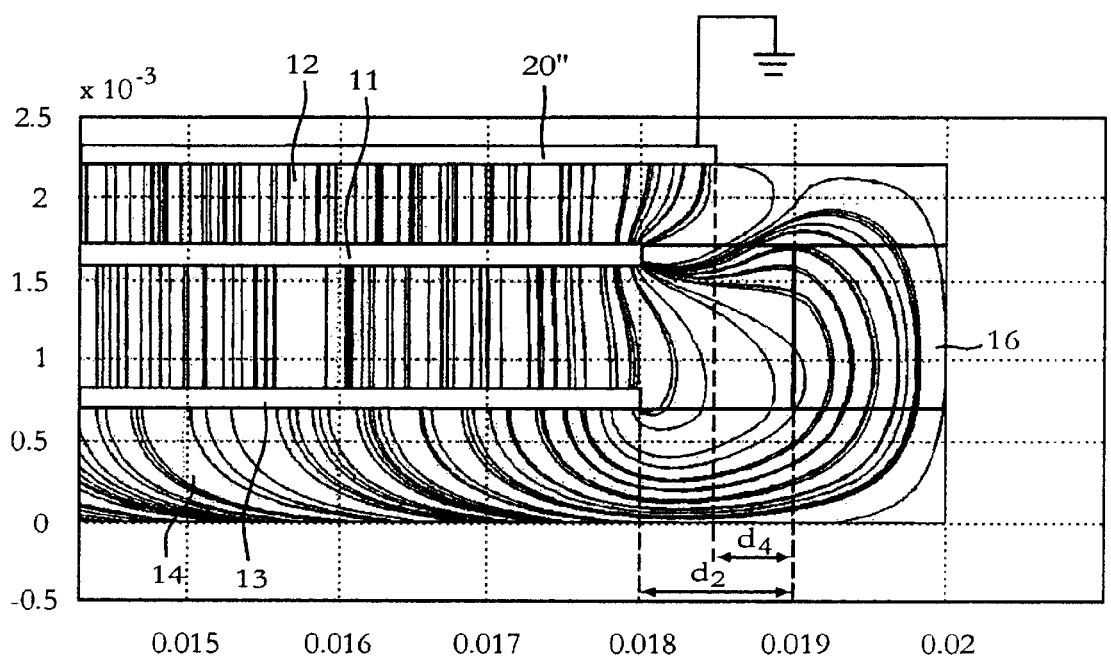

With reference next to FIG. 5, which schematically illustrates in a front view a portion of still a modified radiation detector a fourth embodiment of the present invention will shortly be outlined. This detector differs from the FIG. 2 detector only as regards the extension of the electrically conducting layer 20. The layer, in FIG. 5 denoted 20", extends above the cathode layer 11 and beyond the outer periphery of the cathode layer 11 by a distance $d_4$, which as indicated in FIG. 5, is shorter then the distance $d_2$ between the inner surface of the spacer 16 and the outer peripheries of the electrode layers 11, 13.

As illustrative examples, inventive detector apparatus of the present invention may contain a gas mixture of 80% Xe and 20% $CO_2$ at atmospheric pressure and the voltage across the electrodes may be 1000 V for an inter-electrode distance of 0.5 mm. The substrate 12, 14 thickness may be 1 mm, $d_2$ may be 1 mm, $d_3$ may be 1.5 mm and $d_4$ may be 0.5 mm. An exemplary size of the detectors may involve a width of 50 mm and a depth of 35 mm.

Figure 6:
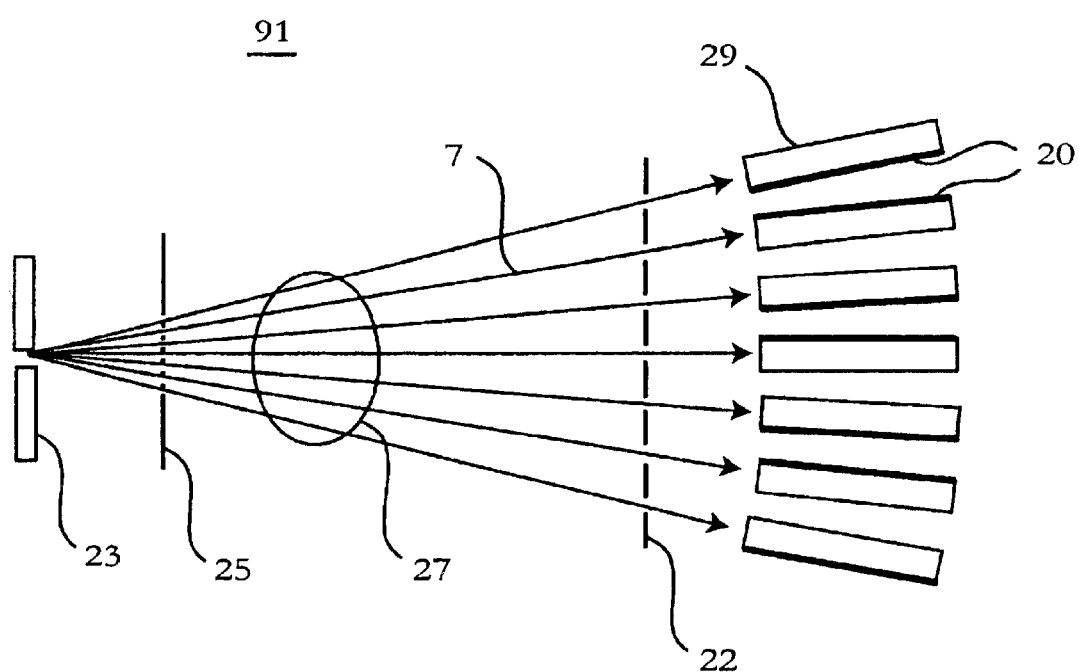
FIG. 6 is a schematic cross sectional view of a device with stacked detectors for use in planar beam radiography according to a further embodiment the invention.

FIG. 6 shows schematically a device 91 according to an embodiment of the present invention having a plurality of the inventive detectors stacked, on top of each other. By this embodiment multiline scan can be achieved, which reduces the overall scanning distance, as well as the scanning time.

The device of this embodiment includes an X-ray source 23, which together with a number of collimator windows 25 produce number of planar fan-shaped X-ray beams 7, for irradiation of the object 27 to be imaged. The beams transmitted through the object 27 optionally enter the individual stacked detectors 29 through a number of second collimator windows 22, which are aligned with the X-ray beams. The first collimator windows 25 are arranged in a first rigid structure (not shown in FIG. 6), and the optional second collimator windows 22 are arranged in a second rigid structure (not shown in FIG. 6) attached to the detectors 29, or arranged separately on the detectors.

The X-ray source 23, the first rigid structure, and the possible second rigid structure including collimator windows 22, respectively, and the stacked detectors 29, which are fixed to each other, are connected and fixed in relation to each other by a certain means, e.g. a frame or support (not shown in FIG. 6). The so formed device for radiography can be moved as a unit to scan an object, which is to be examined. In this multiline configuration, the scanning can be done in a transverse movement, perpendicular to the X-ray beam, as mentioned above. It can also be advantageous if the device for radiography is fixed and the object to be imaged is moved. Alternatively, the collimator and the detector can be moved synchronously by a commonly controlled motor.

According to the present invention, each of the detectors has a respective inventive electrically conducting layer 20 formed on the cathode arrangement, i.e. on its dielectric substrate, as in FIG. 2. Further, in order reduce the risk for occurrence of sparks between the detectors in such a stacked configuration every second detector is turned upside down such that the electric potential of two adjacent electrodes belonging to different detectors are to be held at the same or at least similar electrodes. Hereby the detectors may be arranged very close to each other without any sparking between the detectors.

It shall be appreciated that detectors 29 may alternatively be any of the other detectors as described herein.

Turning now back to the detector design, it shall be appreciated by the man skilled in the art that the inventive electrically conducting layer can in fact modify the electric field in the inter-electrode space in a suitable manner without covering the central portions of the electrode. Thus, in the case of a rectangular-electrode detector, the inventive electrically conducting layer may be formed as a rectangular strip conductor, where the strip overlies the outer periphery of the electrode layer or next thereto. The width of the strip may be very narrow, or it may be extended a considerable or substantial part of the distance from the outer periphery of the electrode layer to the outer periphery of the electrode substrate.

Further, the inventive electrically conducting layer may alternatively be formed only on the surface of the dielectric anode substrate 14 opposite to the surface thereof facing the inter-electrode space 15, and, during use, held at an electric potential close to the one, at which the cathode layer 11 is held.

Again further, the electrodes 11 and 13 need not end at an equal distance $d_2$ from spacer 16.

Still further, the inventive electrically conducting layer may alternatively be held, during use, at other appropriate electric potential depending on the electric potentials, at which the cathode and the anode, respectively, are held.

Yet further, it shall be appreciated that the present invention may be used in connection with detectors, which differ from the exemplary detectors as shown in the accompanying Figures.

Particularly, the invention may be used in the following kind of detectors:

Two-dimensional wherein the incident radiation enters the detector through anyone of the electrodes.

High gain gaseous-based detectors including avalanche amplification means, possibly including further electrodes and other equipment.

Combination detectors including a gaseous-based detector section and any other kind of detector.

Gaseous-based detectors with narrow gaps and/or non-parallel electrodes.

Gaseous-based detectors with semiconducting or other kind of resistive material-based electrodes.

Gaseous-based detectors with energy-resolved measurement capabilities.

Scintillator/Gaseous-based hybride detectors.

Gaseous-based detectors for use in planar beam radiography.

Gaseous-based detectors adapted for scanning.

Gaseous-based detectors for use in computerized tomography (CT) or in positron emission tomography (PET).

For further details regarding different kind of detectors wherein the present inventive electric field line modifiers may be used reference is made to the following U.S. patent applications by Tom Francke et al. and assigned to XCounter AB, which applications hereby are incorporated by reference: Ser. Nos. 08/969,554 (issued as U.S. Pat. No. 6,118,125); 09/444,569 (issued as U.S. Pat. No. 6,414,317), 09/443,292 (issued as U.S. Pat. No. 6,373,065), 09/443,321 (issued as U.S. Pat. No. 6,518,578), 09/443,320 (issued as U.S. Pat. No. 6,385,282); 09/550,288 (issued as U.S. Pat. No. 6,476,397); 09/551,603 (issued as U.S. Pat. No. 6,477,223); 09/552,692 (issued as U.S. Pat. No. 6,337,482); 09/698,173 (issued as U.S. Pat. No. 6,614,180); 09/698,174; 09/709,305; 09/708,521 (issued as U.S. Pat. No. 6,546,070); 09/716,228 (issued as U.S. Pat. No. 6,522,722); 09/752,722; and 09/760,748 (issued as U.S. Pat. No. 6,600,804).

What is claimed is:

1. A detector for detection of ionizing radiation comprising:

a space, which during use of said detector, is filled with an ionizable gas;

a radiation entrance arranged such that ionizing radiation can enter said space for ionizing the ionizable gas;

a cathode arrangement including a dielectric cathode substrate having first and second oppositely facing surfaces, and an electrically conducting cathode layer formed on the first surface of said dielectric cathode substrate;

an anode arrangement including a dielectric anode substrate having first and second oppositely facing surfaces, and an electrically conducting anode layer formed on the first surface of said dielectric anode substrate, wherein said electrically conducting cathode and anode layers are facing each other, separated by said space, and, during use, held at respective first and second electric potentials to thereby drift electrons created during ionization of said ionizable gas towards the electrically conducting anode layer;

a dielectric spacer between said dielectric cathode and anode substrates for holding said cathode and anode arrangements at a distance from each other;

a read-out arrangement for, during use of said detector, detecting electrons drifted towards the electrically conducting anode layer and/or ions drifted towards the electrically conducting cathode layer; and an electrically conducting electric field correction layer formed on the second surface of said dielectric cathode substrate or on the second surface of said dielectric anode substrate, and, during use, held at a selected electric potential to thereby reduce the risk of occurrence of sparks between the cathode and anode arrangements.

2. The detector of claim 1 wherein the first surface of said dielectric cathode substrate; said electrically conducting cathode layer; the first surface of said dielectric anode substrate; and said electrically conducting anode layer are substantially planar.

3. The detector of claim 2 wherein the first surface of said dielectric cathode substrate; said electrically conducting cathode layer; the first surface of said dielectric anode substrate; and said electrically conducting anode layer are parallel to each other.

4. The detector of claim 2 wherein said electrically conducting cathode layer is formed only on a portion of the first surface of said dielectric cathode substrate, thus leaving the outer periphery of the first surface of said dielectric cathode substrate uncovered.

5. The detector of claim 2 wherein said electrically conducting anode layer is formed only on a portion of the first surface of said dielectric anode substrate, thus leaving the outer periphery of the first surface of said dielectric anode substrate uncovered.

6. The detector of claim 5 wherein said dielectric spacer between said electrically conducting cathode and anode layers for holding said electrically conducting cathode and anode layers at a distance from each other, are arranged at the outer uncovered peripheries of the first surfaces of said dielectric cathode and anode substrates at a distance from the outer borders of the electrically conducting cathode and anode layers.

7. The detector of claim 6 wherein said electric field correction layer formed on the second surface of said dielectric cathode substrate, or formed on the second surface of said dielectric anode substrate, and, during use, held at a selected electric potential, at least covers an area, which includes a line being the intersection between the second surface, on which the electric field correction layer is formed, and planes orthogonal to the plane of the electrically conducting layer formed on the first surface of the dielectric substrate, on which the electric field correction layer is formed, and including the outer border of the electrically conducting layer formed on the first surface of the dielectric substrate, on which the electric field correction layer is formed.

8. The detector of claim 7 wherein said electric field correction layer at least covers an area, which extends outwardly a distance being the distance from the outer border of the electrically conducting layer formed on the first surface of the dielectric substrate, on which the electric field correction layer is formed, to the dielectric spacer.

9. The detector of claim 8 wherein said electric field correction layer at least covers an area, which extends outwardly a distance being longer than the distance from the outer border of the electrically conducting layer formed on the first surface of the dielectric substrate, on which the electric field correction layer is formed, to the dielectric spacer.

10. The detector of claim 1 wherein said electrically conducting cathode layer is held, during use, at a negative electric potential, while said electrically conducting anode layer and said electric field correction layer, being formed on the second surface of said dielectric cathode substrate, are grounded provided that the thicknesses of the dielectric cathode and anode substrates and the length of the electrically conducting cathode and anode layer separation are of the same order of magnitude.

11. A device for use in planar beam radiography comprising:

an X-ray source;

means for forming an essentially planar X-ray beam located between said X-ray source and an object to be imaged; and the detector of claim 1 located and arranged for detection of the planar X-ray beam as transmitted through or reflected off said object.

12. The device of claim 11 wherein said X-ray source, said means for forming an essentially planar X-ray beam and said detector are fixed in relation to each other.

13. A device for use in planar beam radiography comprising:

an X-ray source;

a plurality of the detector of claim 1, which detectors are stacked to form a detector unit;

and means for forming an essentially planar X-ray beam for each detector, said means being located between said X-ray source and an object to be imaged, wherein each detector is located and arranged for detection of a respective one of the planar X-ray beams as transmitted through or reflected off said object, and the detectors are stacked such that the cathode arrangement of every second detector is facing a first direction and the cathode arrangements of the other detectors are facing a second direction, which is opposite to said first direction.

14. A gaseous-based radiation detector comprising:

a first and a second electrode arrangement, each including a dielectric substrate having first and second oppositely facing surfaces, and an electrically conducting layer formed on the first surface of respective dielectric substrate, wherein the electrodes are oriented such that the electrically conducting layers are facing each other; and a dielectric spacer arranged to hold said electrodes at a distance from each other to thereby define an inter-electrode space, which during use of said detector, is filled with an ionizable gas, wherein said first and second electrodes, during use, are held at respective first and second electric potentials to thereby drift electrons released during ionization of said ionizable gas by external radiation towards one of the electrodes for detection, and said detector further comprises an electrically conducting layer formed on the second surface of the dielectric substrate of either one of the electrodes, and, during use, held at a selected electric potential.

15. The gaseous-based radiation detector of claim 14 wherein said dielectric spacer and each of said electrically conducting layers are separated from each other in the plane of the substrate surface, on which the electrically conducting layer is formed.

16. The gaseous-based radiation detector of claim 14 wherein said electrically conducting layer formed on the second surface of the dielectric substrate of either one of the electrodes, and, during use, held at a selected electric potential equal is held at an electric potential equal or similar to the electric potential of the other one of the electrodes provided that the thicknesses of the two electrode substrates and the inter-electrode space are of the same order of magnitude.

17. The gaseous-based radiation detector of claim 14 wherein said electrically conducting layer formed on the second surface of the dielectric substrate of either one of the electrodes, and said other one of the electrodes are grounded provided that the thicknesses of the two electrode substrates and the inter-electrode space are of the same order of magnitude.

18. A gaseous-based radiation detector comprising:

a first and a second electrode arrangement, each including a dielectric substrate and an electrically conducting layer formed on a surface of respective dielectric substrate, wherein the electrodes are oriented such that the electrically conducting layers are facing each other; and a dielectric spacer arranged to hold said electrodes at a distance from each other to thereby define an inter-electrode space, which during use of said detector, is filled with an ionizable gas, wherein said first and second electrodes, during use, are held at respective first and second electric potentials to define an electric field within said inter-electrode space (15, 17) for drifting electrons released during ionization of said ionizable gas by external radiation towards one of the electrodes for detection, and said detector further comprises electric field correction means for affecting the electric field within said inter-electrode space, particularly in the outer portions thereof, to prevent electric field lines from being parallel, or close to parallel, with spacer, and optionally substrate, surfaces defining said inter-electrode space at the respective spacer, and optionally substrate, surfaces.

19. The gaseous-based radiation detector of claim 18 wherein said electric field correction means is arranged to affect the electric field within said inter-electrode space such that each electric field line leaving said inter-electrode space will define an angle with respect to the spacer or substrate surface, which is at least 5°, preferably at least 10°, and most preferably at least 15°.

20. The gaseous-based radiation detector of claim 18 wherein said electric field correction means is an electrically conducting layer, which, during use of said detector, is held at an electric potential.

* * * * *